(12) United States Patent
Arai et al.

(10) Patent No.: US 11,421,177 B2
(45) Date of Patent: Aug. 23, 2022

(54) SLIDING MEMBER FOR SEALING AND SEAL DEVICE

(71) Applicant: Eagle Industry Co., Ltd., Tokyo (JP)

(72) Inventors: Minehiro Arai, Tokyo (JP); Hideki Tomoto, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 0 days.

(21) Appl. No.: 17/281,871

(22) PCT Filed: Oct. 28, 2019

(86) PCT No.: PCT/JP2019/042182
§ 371 (c)(1),
(2) Date: Mar. 31, 2021

(87) PCT Pub. No.: WO2020/090745
PCT Pub. Date: May 7, 2020

(65) Prior Publication Data
US 2021/0388286 A1  Dec. 16, 2021

(30) Foreign Application Priority Data
Nov. 2, 2018 (JP) .............................. JP2018-207369

(51) Int. Cl.
*C10M 169/04* (2006.01)
*C10M 103/02* (2006.01)
(Continued)

(52) U.S. Cl.
CPC ........ *C10M 169/04* (2013.01); *C10M 103/02* (2013.01); *C10M 125/10* (2013.01);
(Continued)

(58) Field of Classification Search
CPC .................. C10M 169/04; C10M 103/02; C10M 125/10; C10M 2201/0413;
(Continued)

(56) References Cited

U.S. PATENT DOCUMENTS 5,538,649 A * 7/1996 Demendi ............. F16J 15/3496
508/108
6,091,437 A * 7/2000 Yoneda ................. B41J 2/3355
347/171
(Continued)

FOREIGN PATENT DOCUMENTS

JP       S61-14278 A    1/1986
JP       2013-53693 A   3/2013
(Continued)

OTHER PUBLICATIONS

International Search Report issued in corresponding International Application No. PCT/JP2019/042182 dated Nov. 19, 2019.
(Continued)

*Primary Examiner* — Pamela H Weiss
(74) *Attorney, Agent, or Firm* — ArentFox Schiff LLP

(57) ABSTRACT

Provided are a sliding member for sealing and a seal device that exhibit good sealing performance even when used in an environment where silicon oxide is likely to be deposited; the sliding member for sealing includes a sintered body consisting of 1.0 to 12.5 wt.% of cerium oxide, a combination of 20 to 50 wt.% of graphite and graphitizable carbon, and a remainder of non-graphitizable carbon; and, the sliding member for sealing is used as, for example, a rotary seal ring or a stationary seal ring.

8 Claims, 1 Drawing Sheet

(51) Int. Cl.
*C10M 125/10* (2006.01)
*F16J 15/34* (2006.01)
*C10N 20/06* (2006.01)
*C10N 50/08* (2006.01)

(52) U.S. Cl.
CPC .. *F16J 15/3496* (2013.01); *C10M 2201/0413* (2013.01); *C10M 2201/062* (2013.01); *C10N 2020/06* (2013.01); *C10N 2050/08* (2013.01)

(58) Field of Classification Search
CPC ........... C10M 2201/062; F16J 15/3496; C10N 2020/06; C10N 2050/08; F04D 29/026; F04D 29/126; F05D 2300/224
See application file for complete search history.

(56) References Cited

U.S. PATENT DOCUMENTS

| | | | | |
|---|---|---|---|---|
| 7,090,919 B2* | 8/2006 | Tomoto | ................ | C04B 35/632 428/323 |
| 7,264,877 B2* | 9/2007 | Tomoto | ................ | F16J 15/3496 428/408 |
| 2009/0136838 A1* | 5/2009 | Abe | ................ | H01M 10/0569 429/220 |
| 2015/0368578 A1* | 12/2015 | Woydt | ................ | C23C 28/042 508/103 |
| 2015/0372350 A1* | 12/2015 | Solomon | ................ | H01G 9/048 429/105 |
| 2016/0230892 A1 | 8/2016 | Yoshino | | |

FOREIGN PATENT DOCUMENTS

| | | |
|---|---|---|
| JP | 2018-71606 A | 5/2018 |
| WO | WO 2015108107 A | 7/2015 |

OTHER PUBLICATIONS

International Preliminary Report on Patentability issued from the International Bureau in counterpart International Application No. PCT/JP2019/042182, dated May 14, 2021.

* cited by examiner

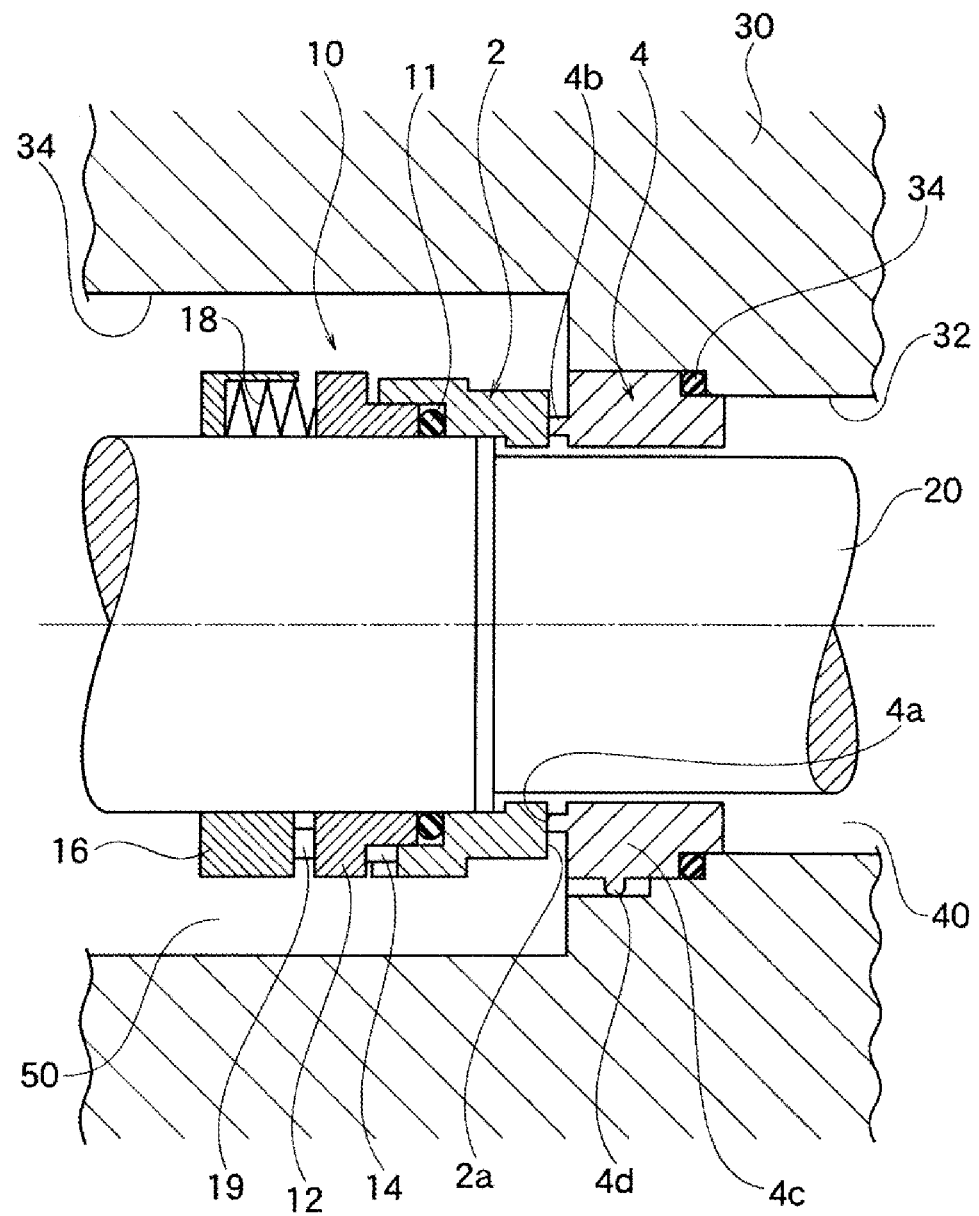

SLIDING MEMBER FOR SEALING AND SEAL DEVICE

This application is a 35 U.S.C. § 371 National Phase of PCT Application No. PCT/JP2019/042182 filed on Oct. 28, 2019, which claims priority to Japanese Patent Application No. 2018-207369 filed Nov. 2, 2018, the disclosures of each of which are hereby incorporated by reference in their entireties.

TECHNICAL FIELD

The present invention relates to a sliding member for sealing and a seal device.

BACKGROUND ART

There is known a sliding member for mechanical sealing described in, for example, the following Patent Document 1 or Patent Document 2. This type of sliding member is produced by mixing a carbon filler, a binder resin, and silicon oxide, and molding and sintering the mixture.

This type of sliding member may be exposed to an aqueous sealing fluid such as a long life coolant (LLC) containing a silicate-based rust inhibitor component. In such a usage environment, Si contained in the LLC reacts with O to generate $SiO_2$, and a deposit of $SiO_2$ is likely to be formed on the surface of the sliding member. When the deposit of $SiO_2$ is formed on the sliding member, a sliding gap is widened, which is a concern and sealing performance is impaired, which is a concern.

CITATION LIST

Patent Document

Patent Document 1: JP S61-014278 A
Patent Document 2: WO 2015/108107 A

SUMMARY OF THE INVENTION

Problem to be Solved by the Invention

The present invention has been made in light of such a reality, and an object of the present invention is to provide a sliding member for sealing and a seal device that exhibit good sealing performance even when used in an environment where silicon oxide is likely to be deposited.

Means for Solving Problem

In order to achieve the above object, a sliding member for sealing according to the present invention includes a sintered body consisting of 1.0 to 12.5 wt % of cerium oxide, a combination of 20 to 50 wt % of graphite and graphitizable carbon, and a remainder of non-graphitizable carbon.

In the sliding member for sealing according to the present invention, the cerium oxide ($CeO_2$, $Ce_2O_3$, or the like) is contained in a predetermined ratio, together with a combination of the graphite and the graphitizable carbon, and the non-graphitizable carbon. Since the sliding member for sealing according to the present invention contains the cerium oxide in the predetermined ratio, silicon oxide can be suppressed from being generated on the surface of the sliding member even in an environment exposed to an aqueous solution containing, for example, a silicate-based component, without impairment of moldability.

Further, since the sliding member for sealing according to the present invention contains the non-graphitizable carbon such as hard carbon (HC) in a predetermined ratio, if a deposit is generated on a sliding surface, the deposit is polished, so that the deposit is suppressed from being formed on the surface of the sliding member for sealing.

Further, since the sliding member for sealing according to the present invention also contains a combination of the graphite and the graphitizable carbon in a predetermined ratio, heat is suppressed from being generated on the sliding surface of the sliding member, so that the generation of the silicon oxide is suppressed.

An average particle size of the cerium oxide may be from 1.0 to 6.0 μm. It is confirmed that since the cerium oxide having a particle size in such a range is contained in the sliding member for sealing, sealing performance is improved.

The sliding member for sealing may be molded in a ring shape. Since the sliding member for sealing is molded in such a shape, the sliding member for sealing can be preferably used as a seal ring of a mechanical seal device.

A seal device according to the present invention includes the sliding member for sealing according to any one of the above aspects. The seal device according to the present invention is particularly useful when the sliding member for sealing is exposed to an aqueous sealing fluid containing a silicate component.

BRIEF DESCRIPTION OF DRAWINGS

FIGURE is a cross-sectional view of a main part of a mechanical seal device according to one embodiment of the present invention.

MODE(S) FOR CARRYING OUT THE INVENTION

Hereinafter, the present invention will be described based on an embodiment illustrated in the drawing.

As illustrated in FIGURE, a sliding member for sealing according to one embodiment of the present invention is, for example, a rotary seal ring 2 molded in a ring shape, and is assembled into, for example, a mechanical seal device 10 for a water pump to be used.

The mechanical seal device 10 is mounted in a mounting space between a rotary shaft 20 and a housing 30 to seal between a sealing fluid side space 50 located inside the housing 30 and an atmosphere side space 40 communicating with an outer space of the housing 30. A sealing fluid containing silicate is sealed in the sealing fluid side space 50.

The rotary seal ring 2 is installed on the rotary shaft 20 so as to be movable in an axial direction as a sliding member, and is rotatable together with the rotary shaft 20. A sliding surface 2a is formed on a distal end side (side close to a stationary seal ring 4) in the axial direction of the rotary seal ring 2. In addition, a sliding surface 4a is formed on a distal end side (side close to the rotary seal ring 2) in the axial direction of the stationary seal ring 4. The sliding surfaces 2a and 4a slide on each other while rotating relative to each other, to seal between an inner peripheral side space and an outer peripheral side space of the seal rings 2 and 4.

In the present embodiment, the sliding surface 4a is formed in a distal end surface of a ring-shaped protrusion 4b formed on the distal end side of the stationary seal ring 4. The thickness in a radial direction of the ring-shaped protrusion 4b is smaller than the thickness in the radial direction of a main body portion 4c of the stationary seal ring 4. In addition, the inner diameter of the ring-shaped protrusion 4b is larger than the inner diameter of the sliding surface 2a and the outer diameter of the ring-shaped protrusion 4b is smaller than the outer diameter of the sliding surface 2a such that the width in the radial direction of the sliding surface 4a is smaller than the width in the radial direction of the sliding surface 2a.

An outer peripheral portion of the stationary seal ring 4 is mounted, via an O-ring 33, on a step portion formed in an atmosphere side inner diameter portion 32 of the housing 30. The atmosphere side inner diameter portion 32 of the housing 30 communicates with an outer space of the housing 30, and in the present embodiment, communicates with the atmosphere side space 40. The atmosphere side space 40 communicates with an inner diameter side gap between the stationary seal ring 4 and the rotary shaft 20 and an inner diameter side gap between a distal end portion of the rotary seal ring 2 and the rotary shaft 20.

A sealing side inner diameter portion 34 is formed in the housing 30 to be adjacent to the atmosphere side inner diameter portion 32 of the housing 30. In the present embodiment, the inner diameter of the sealing side inner diameter portion 34 is larger than the inner diameter of the atmosphere side inner diameter portion 32. The stationary seal ring 4 is mounted in a boundary portion between the sealing side inner diameter portion 34 and the atmosphere side inner diameter portion 32, and the O-ring 33 suppresses the atmosphere side space 40 and the sealing side space 50 from communicating with each other through a gap between the stationary seal ring 4 and the housing 30.

A protrusion 4d for locking is formed in an outer peripheral portion of the main body portion 4c such that the stationary seal ring 4 does not rotate together with the rotary seal ring 2, and the protrusion 4d engages with an engaging groove of the casing 30 to perform locking.

An O-ring pressor 12 is installed on a rear end side (side away from the stationary seal ring 4) in the axial direction of the rotary seal ring 2 so as to be movable with respect to the rotary shaft 20 in the axial direction such that an O-ring 11 is pressed in the axial direction. The O-ring pressor 12 presses the rotary seal ring 2 via the O-ring 11 in a direction toward the stationary seal ring 4. The O-ring pressor 12 and the rotary seal ring 2 are locked by, for example, a locking pin 14 or the like, and are rotatable around an axis of the rotary shaft 20, together with the rotary shaft 20.

A spring pressor 16 is fixed to the rotary shaft 20 on a rear end side (side away from the stationary seal ring 4) in the axial direction of the O-ring pressor 12, and rotates together with the rotary shaft 20. The spring pressor 16 has a ring shape, spring holding holes are formed at a plurality of locations in a circumferential direction of the spring pressor 16, and the O-ring pressor 12 is pressed in a direction toward the rotary seal ring 2 in the axial direction by the compressive force of a spring 18 held by each of the spring holding holes. In addition, the spring pressor 16 and the O-ring pressor 12 are locked by, for example, a locking pin 19, and collectively rotate around the axis, together with the rotary shaft 20.

The spring force of the spring 18 is transmitted to the rotary seal ring 2 through the O-ring pressor 12 and the O-ring 11 to press the sliding surface 2a of the distal end portion of the rotary seal ring 2 against the sliding surface 4a of the stationary seal ring 4. As a result, the sliding surface 2a and the sliding surface 4a rotate relative to each other around the axis of the rotary shaft 20 while being pressed against each other in the axial direction by the spring force exerted by the spring 18 and a fluid pressure inside the space 50, the fluid pressure being applied to a rear end surface in the axial direction of the O-ring pressor 12. As a result, sealing is made between the atmosphere side space 40 located on inner peripheral surfaces of the rings 2 and 4 and the sealing fluid side space 50 located on an outer peripheral side of the rings 2 and 4.

In the present embodiment, in the mechanical seal device 10 with such a configuration, the rotary seal ring 2 can be formed as the sliding member for sealing according to the present embodiment, and the stationary seal ring 4 as a mating ring which is a mating side of sliding can be made of the same material as that of the seal ring 2, but in the present embodiment, is made of a material harder than that of the seal ring 2. For example, the seal ring 4 is made of silicon carbide, titanium carbide, tungsten carbide, or the like which is used as a sliding material in related art.

The sliding member for sealing forming the stationary seal ring 4 according to the present embodiment is made of a sintered body consisting of 1.0 to 12.5 wt % of cerium oxide, a combination of 20 to 50 wt % of graphite and graphitizable carbon, and a remainder of non-graphitizable carbon. The cerium oxide is contained in the sliding member for sealing in an amount of preferably 1.1 to 12.1 wt %, further preferably 2 to 11 wt %. A combination of the graphite and the graphitizable carbon is contained in the sliding member for sealing in an amount of preferably 23.1 to 49.6 wt %, further preferably 36.9 to 41.3 wt %.

The cerium oxide is contained as $CeO_2$, $Ce_2O_3$, or the like in the sliding member, and the particle size of the cerium oxide is preferably from 1.0 to 6.0 μm. It is confirmed that since the cerium oxide having a particle size in such a range is contained in the sliding member for sealing, sealing performance is improved.

Either natural graphite or artificial graphite may be used as the graphite. In addition, the graphitizable carbon can be defined as a carbon material of the (002) plane has a plane spacing of 0.34 nm to 0.360 nm.

In addition, the non-graphitizable carbon can be defined as a carbon material of which the (002) plane has a plane spacing of more than 0.360 nm, and may be referred to as glassy carbon or hard carbon (HC). The shape of the non-graphitizable carbon is not particularly limited, and a fibrous shape, a granular shape, and the like are provided as examples of the shape.

A method for analyzing the sliding member to obtain the weight ratio of a combination of the cerium oxide, the graphite, and the graphitizable carbon, and the non-graphitizable carbon is not particularly limited, and thermal analysis, fluorescent X-ray analysis, and the like are provided as examples of the method.

The rotary seal ring 2 formed of the sliding member for sealing according to the present embodiment is obtained by kneading the cerium oxide having a particle size in a predetermined range, a combination of the graphite and the graphitizable carbon, the non-graphitizable carbon, and a binder resin, molding the kneaded article in a ring shape, and then sintering the molded body at a temperature of 800° C. to 1,500° C. The binder resin is not particularly limited. For example, phenolic resin, polyimide resin, epoxy resin, furan resin, and the like are used, and phenolic resin is preferably used.

In the sliding member for sealing according to the present embodiment, $CeO_2$ is contained in a predetermined ratio, together with a combination of the graphite and the graphitizable carbon, and the non-graphitizable carbon. It is considered that the cerium oxide is dispersed in the grain boundaries of the non-graphitizable carbons such as carbon fillers.

The sliding member for sealing according to the present embodiment does not substantially contain the silicon oxide. The expression "the sliding member for sealing does not substantially contain the silicon oxide" means that an inevitable amount is contained.

The silicon oxide has a property of being easily adsorbed to the silicon oxide; however, since the sliding member for sealing according to the present embodiment does not substantially contain the silicon oxide, the silicon oxide is unlikely to be deposited on the sliding member.

In addition, since the sliding member for sealing according to the present embodiment contains the cerium oxide in the predetermined ratio, the silicon oxide can be suppressed from being generated on the surface of the sliding member even in an environment exposed to the LLC containing, for example, a silicate-based component, without impairment of moldability. The reason is not necessarily apparent, and the following reason is considered.

Namely, in the sliding member for sealing of the related art, silicate of the LLC is affected by heat induced by sliding to form a deposit on a sliding surface, so that sealing performance deteriorates, which is a concern. On the other hand, it is considered that since the sliding member for sealing according to the present embodiment contains the cerium oxide in the predetermined ratio, cerium ions of the cerium oxide has the function of weakening and separating the bond between Si and O, together with H2O, to prevent the silicon oxide from being deposited on the sliding member.

Further, since the sliding member for sealing according to the present embodiment contains the non-graphitizable carbon such as hard carbon (HC) in a predetermined ratio, a deposit can be suppressed from being formed on the surface of the sliding member for sealing.

Further, since the sliding member for sealing according to the present embodiment also contains a combination of the graphite and the graphitizable carbon in a predetermined ratio, heat is suppressed from being generated on the sliding surface of the sliding member, so that the generation of the silicon oxide is suppressed.

The mechanical seal device 10 according to the present embodiment includes the rotary seal ring 2 formed of the sliding member for sealing described above. For this reason, for example, even when the aqueous sealing fluid containing a silicate component is sealed in the sealing fluid side space 50, the silicon oxide can be effectively prevented from being deposited on the sliding surface 2a of the rotary seal ring 2 or other surfaces. For this reason, the sliding surfaces 2a and 4a are effectively suppressed from being unevenly opened from each other, so that sealing performance is improved.

Incidentally, the present invention is not limited to the above-mentioned embodiment, and various modifications can be made without departing from the scope of the present invention.

For example, in the above-described embodiment, the sliding member for sealing according to the present embodiment has been used as the rotary seal ring 2, but can be also used as the stationary seal ring 4. When the sliding member for sealing according to the present embodiment is used as the stationary seal ring 4, the material of the rotary seal ring 2 which is a mating side may be the material provided as examples of that of the stationary seal ring 4 in the above-described embodiment.

EXAMPLES

Hereinafter, the present invention will be described in further detail based on Examples; however, the present invention is not limited to Examples.

Example 1

The rotary seal ring 2 illustrated in FIGURE was produced from a sliding member for sealing. In the production of the sliding member for sealing, cerium oxide having an average particle size of 3.5 μm, flaky graphite (including graphitizable carbon which is not graphitized), and non-graphitizable carbon having an average particle size of 40 μm, and phenolic resin as a binder resin were kneaded in the weight ratio shown in Table 1 and the kneaded article was molded in a ring shape. The molded body obtained was sintered at a temperature of 1,000° C.

Table 2 shows the result of examining the weight ratio of the non-graphitizable carbon, the graphite (including the graphitizable carbon which is not graphitized), and the cerium oxide in the seal ring 2 after sintering. The weight ratio was calculated based on the total weight of the non-graphitizable carbon, the graphite, and the cerium oxide defined as 100 wt %. Regarding the calculation of the weight ratio, the seal ring 2 was cut at an arbitrary cross section, the cut surface was analyzed, and then the area ratio of the non-graphitizable carbon, the graphite, and the cerium oxide was calculated and converted into the weight ratio using the specific gravity of each of the materials.

It could be confirmed that if the change of a part of the phenolic resin used as a raw material into the non-graphitizable carbon was considered, there was consistency between the weight ratio of the raw material and the weight ratio of the seal ring 2 after sintering. In addition, it could be confirmed that the average particle size of the cerium oxide was not changed even after sintering.

In addition, a commercially available seal ring which was made of SiC and was sintered at room temperature was used as the stationary seal ring 4. The rotary seal ring 2 and the stationary seal ring 4 were assembled into the mechanical seal device 10 illustrated in FIGURE, and the mechanical seal device 10 was mounted in a test device. The test device was a vertical seal device. The test conditions were as follows.

The rotation speed of the rotary shaft was 2,000 rpm, the test time was 24 hours, an LLC 50% aqueous solution in which a silicate-based component was mixed was used as the sealing fluid, and the surface pressure between sliding surfaces was 0.2 MPa. The surface pressure was substantially the same as an actual surface pressure during usage of the mechanical seal device for a water pump. The leakage amount of the mechanical seal device 10 was examined. A case where the leakage amount of the test result was 0.1 mL/1 h or less (leakage amount per one hour is 0.1 mL or less) was marked with evaluation B, a case where the leakage amount was 0.05 mL/1 h or less was marked with evaluation A, and a case where the leakage amount was larger than 0.1 mL/1 h was marked with x, and the results were shown in Table 2. Incidentally, "-" in the item of a leakage test in Table 2 indicates that the test could not be performed.

In addition, the ease to produce the seal ring 2 was also examined. Regarding the ease to produce the seal ring 2, a case where production was not feasible due to reasons (the seal ring 2 was not established as a product (poor moldability, sintering crack, and the like)) was marked with evaluation x, a case where production was feasible but production was difficult was marked with evaluation B, and a case where production was feasible without problems was marked with evaluation A, and the results were shown in Table 2.

Examples 2 to 9

Except that in a raw material stage, the weight ratio of the non-graphitizable carbon, the graphite, and the cerium oxide and the particle size of the cerium oxide were changed as shown in Table 1, the seal rings 2 formed of sliding members were produced similar to Example 1, and measurement and evaluation were performed similar to Example 1. The results were shown in Table 2.

Comparative Examples 10 to 11

Except that in a raw material stage, the weight ratio of the non-graphitizable carbon, the graphite, and the cerium oxide and the particle size of the cerium oxide were changed as shown in Table 1, the seal rings 2 formed of sliding members were produced similar to Example 1, and measurement and evaluation were performed similar to Example 1. The results were shown in Table 2.

Comparative Example 12

Except that in a raw material stage, the cerium oxide was not added and the weight ratio of the non-graphitizable carbon and the graphite was changed as shown in Table 1, the seal ring 2 formed of a sliding member was produced similar to Example 1, and measurement and evaluation were performed similar to Example 1. The result was shown in Table 2.

Evaluation

It could be confirmed that even when the seal ring in which the cerium oxide ($CeO_2$) was contained in a predetermined ratio as shown in Table 2, together with the graphite and the non-graphitizable carbon, was slid in the silicate LLC, sealing performance was improved. The reason is considered that the volume of the silicon oxide can be suppressed, particularly, is considered that as the weight ratio of the cerium oxide ($CeO_2$) is increased and the specific surface area of the cerium oxide on the surface is increased, the effect of suppressing deposit of the silicon oxide is further improved.

TABLE 1

|  | No. | Non-graphitizable carbon (Parts by mass) | Graphite (Parts by mass) | Phenolic resin (Parts by mass) | Cerium oxide (Parts by mass) | Particle size of cerium oxide (μm) |
| --- | --- | --- | --- | --- | --- | --- |
| Comparative Example | 10 | 31 | 31 | 23 | 15 | 1.0 |
| Comparative Example | 11 | 32.5 | 32.5 | 23 | 12 | 1.0 |
| Example | 1 | 45 | 21 | 23 | 11 | 3.5 |
| Example | 2 | 33.5 | 33.5 | 23 | 10 | 3.5 |
| Example | 3 | 34.5 | 34.5 | 23 | 8 | 1.0 |
| Example | 4 | 34.5 | 34.5 | 23 | 8 | 6.0 |
| Example | 5 | 35.5 | 35.5 | 23 | 6 | 3.5 |
| Example | 6 | 36.5 | 36.5 | 23 | 4 | 1.0 |
| Example | 7 | 36.5 | 36.5 | 23 | 4 | 6.0 |
| Example | 8 | 37.5 | 37.5 | 23 | 2 | 3.5 |
| Example | 9 | 31 | 45 | 23 | 1 | 3.5 |
| Comparative Example | 12 | 38.5 | 38.5 | 23 | 0 | — |

TABLE 2

|  | No. | Non-graphitizable carbon (wt %) | Graphite (wt %) | Cerium oxide (wt %) | Ease to produce | Leakage test |
| --- | --- | --- | --- | --- | --- | --- |
| Comparative Example | 10 | 49.3% | 34.1% | 16.5% | X | — |
| Comparative Example | 11 | 51.0% | 35.8% | 13.2% | X | — |
| Example | 1 | 64.8% | 23.1% | 12.1% | B | B |
| Example | 2 | 52.1% | 36.9% | 11.0% | A | A |
| Example | 3 | 53.2% | 38.0% | 8.8% | A | A |
| Example | 4 | 53.2% | 38.0% | 8.8% | A | A |
| Example | 5 | 54.3% | 39.1% | 6.6% | A | A |
| Example | 6 | 55.4% | 40.2% | 4.4% | A | A |
| Example | 7 | 55.4% | 40.2% | 4.4% | A | A |
| Example | 8 | 56.5% | 41.3% | 2.2% | A | A |
| Example | 9 | 49.3% | 49.6% | 1.1% | A | B |
| Comparative Example | 12 | 57.6% | 42.4% | 0.0% | A | X |

EXPLANATIONS OF LETTERS OR NUMERALS

2 ROTARY SEAL RING
2a SLIDING SURFACE
4 STATIONARY SEAL RING
4a SLIDING SURFACE
4b RING-SHAPED PROTRUSION
4c MAIN BODY PORTION
4d PROTRUSION FOR LOCKING
10 MECHANICAL SEAL DEVICE
11 O-RING
12 O-RING PRESSOR
14 LOCKING PIN
16 SPRING PRESSOR
18 SPRING
19 LOCKING PIN
20 ROTARY SHAFT
30 HOUSING
32 ATMOSPHERE SIDE INNER DIAMETER PORTION
33 O-RING
34 SEALING SIDE INNER DIAMETER PORTION
40 ATMOSPHERE SIDE SPACE
50 SEALING FLUID SIDE SPACE

The invention claimed is:

1. A sliding member for sealing comprising:
a sintered body including 1.0 to 12.5 wt % of cerium oxide, a combination of 20 to 50 wt % of graphite and graphitizable carbon, and a remainder of non-graphitizable carbon.

2. The sliding member for sealing according to claim 1, wherein an average particle size of the cerium oxide is from 1.0 to 6.0 μm.

3. The sliding member for sealing according to claim 1, wherein the sliding member for sealing is molded so as to have a ring shape.

4. The sliding member for sealing according to claim 2, wherein the sliding member for sealing is molded so as to have a ring shape.

5. A seal device comprising:
the sliding member for sealing according to claim 1.

6. A seal device comprising:
the sliding member for sealing according to claim 2.

7. A seal device comprising:
the sliding member for sealing according to claim 3.

8. A seal device comprising:
the sliding member for sealing according to claim 4.

* * * * *